(12) United States Patent
Tripathi et al.

(10) Patent No.: US 8,675,644 B2
(45) Date of Patent: Mar. 18, 2014

(54) ENHANCED VIRTUAL SWITCH

(75) Inventors: Sunay Tripathi, Palo Alto, CA (US); Nicolas G. Droux, San Jose, CA (US); Kais Belgaied, Sunnyvale, CA (US)

(73) Assignee: Oracle America, Inc., Redwood Shores, CA (US)

( * ) Notice: Subject to any disclaimer, the term of this patent is extended or adjusted under 35 U.S.C. 154(b) by 919 days.

(21) Appl. No.: 12/580,698

(22) Filed: Oct. 16, 2009

(65) Prior Publication Data

US 2011/0090910 A1 Apr. 21, 2011

(51) Int. Cl.
*H04L 12/50* (2006.01)
*H04Q 11/00* (2006.01)

(52) U.S. Cl.
USPC .......... 370/360; 370/359; 370/389; 370/397; 370/399

(58) Field of Classification Search
None
See application file for complete search history.

(56) References Cited

U.S. PATENT DOCUMENTS

| | | | |
|---|---|---|---|
| 6,041,053 A | 3/2000 | Douceur et al. |
| 6,070,219 A | 5/2000 | McAlpine et al. |
| 6,131,163 A | 10/2000 | Wiegel |
| 6,163,539 A | 12/2000 | Alexander et al. |
| 6,477,643 B1 | 11/2002 | Vorbach et al. |
| 6,600,721 B2 | 7/2003 | Edholm |
| 6,714,960 B1 | 3/2004 | Bitar et al. |
| 6,757,731 B1 | 6/2004 | Barnes et al. |
| 6,831,893 B1 | 12/2004 | Ben Nun et al. |
| 6,859,841 B2 | 2/2005 | Narad et al. |
| 6,944,168 B2 | 9/2005 | Paatela et al. |
| 7,046,665 B1 | 5/2006 | Walrand et al. |
| 7,146,431 B2 | 12/2006 | Hipp et al. |
| 7,177,311 B1 | 2/2007 | Hussain et al. |
| 7,260,102 B2 | 8/2007 | Mehrvar et al. |
| 7,313,142 B2 | 12/2007 | Matsuo et al. |
| 2002/0052972 A1 | 5/2002 | Yim |
| 2003/0037154 A1 | 2/2003 | Poggio et al. |
| 2004/0267866 A1 | 12/2004 | Carollo et al. |
| 2005/0111455 A1 | 5/2005 | Nozue et al. |
| 2005/0135243 A1 | 6/2005 | Lee et al. |
| 2005/0138620 A1 | 6/2005 | Lewites |
| 2006/0041667 A1 | 2/2006 | Ahn et al. |
| 2006/0045089 A1 | 3/2006 | Bacher et al. |
| 2006/0070066 A1 | 3/2006 | Grobman |

(Continued)

OTHER PUBLICATIONS

Dovrolis, C., Thayer, B. and Ramanathan, P.: "HIP: Hybrid Interrupt—Polling for the Network Interface", ACM SIGOPS Operating Systems Review, vol. 35, Iss. 4, Oct. 2001, (11 Pages).

(Continued)

*Primary Examiner* — Jae Y Lee
(74) *Attorney, Agent, or Firm* — Osha Liang LLP

(57) ABSTRACT

A system and method for providing network connectivity to a host, involving creating a virtual switch on the host, specifying at least one data link attribute of the virtual switch, creating a plurality of virtual network interface cards (VNICs) on the host, associating each of the plurality of VNICs with the virtual switch, and assigning the at least one data link attribute of the virtual switch to each of the plurality of VNICs, where the virtual switch is connected to a physical network interface card (NIC) associated with the host, where each of the plurality of VNICs is associated with a different one of a plurality of execution environments, where the plurality of execution environments is located on the host, and where the plurality of VNICs is located on the host.

16 Claims, 8 Drawing Sheets

(56) References Cited

U.S. PATENT DOCUMENTS

| | | |
|---|---|---|
| 2006/0174324 A1 | 8/2006 | Zur et al. |
| 2008/0005441 A1* | 1/2008 | Droux et al. ............... 710/306 |
| 2008/0022016 A1* | 1/2008 | Tripathi et al. ............ 709/250 |
| 2008/0043765 A1* | 2/2008 | Belgaied et al. ........... 370/409 |
| 2008/0151893 A1* | 6/2008 | Nordmark et al. ......... 370/392 |
| 2008/0235690 A1* | 9/2008 | Ang et al. .................. 718/102 |
| 2008/0240142 A1* | 10/2008 | Belgaied et al. ........... 370/420 |

OTHER PUBLICATIONS

Tripathi, S.: "Crossbow: Network Virtualization and Resource Control"; Presented at Sun Labs Open House; Jun. 1, 2006; (27 Pages).

\* cited by examiner

ENHANCED VIRTUAL SWITCH

CROSS-REFERENCE TO RELATED APPLICATIONS

The present application contains subject matter that may be related to the subject matter in the following U.S. application filed on Jun. 30, 2006, and assigned to the assignee of the present application: "Virtual Switch" with U.S. application Ser. No. 11/480,261.

BACKGROUND

Network traffic is transmitted from a network, such as the Internet, from a sending system (e.g., a computer system) to a receiving system (e.g., a computer system) via a physical network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

The network includes physical infrastructure, such as, network cable, physical routers, and physical switches, to facilitate the transmission of packets from the sending system to the receiving system.

SUMMARY

In general, in one aspect, the invention relates to a computer readable storage medium having computer readable program code embodied therein, the computer readable program code adapted to, when executed by a processor, implement a method for providing network connectivity to a host. The method includes creating a virtual switch on the host, where the virtual switch is connected to a physical network interface card (NIC) associated with the host, specifying at least one data link attribute of the virtual switch, creating a plurality of virtual network interface cards (VNICs) on the host, where each of the plurality of VNICs is associated with a different one of a plurality of execution environments, associating each of the plurality of VNICs with the virtual switch, and assigning the at least one data link attribute of the virtual switch to each of the plurality of VNICs, where the plurality of execution environments is located on the host, and where the plurality of VNICs is located on the host In general, in one aspect, the invention relates to a method of providing network connectivity to a host. The method includes creating a virtual switch on the host, where the virtual switch is connected to a physical network interface card (NIC) associated with the host, specifying at least one data link attribute of the virtual switch, creating a plurality of virtual network interface cards (VNICs) on the host, where each of the plurality of VNICs is associated with a different one of a plurality of execution environments, associating each of the plurality of VNICs with the virtual switch, and assigning the at least one data link attribute of the virtual switch to each of the plurality of VNICs, where the plurality of execution environments is located on the host, and where the plurality of VNICs is located on the host.

In general, in one aspect, the invention relates to a system. The system includes a physical network interface card (NIC) and a host. The host includes a processor, a virtual switch operatively connected to the physical NIC, a plurality of execution environments, a plurality of virtual network interface cards (VNICs), and a plurality of virtual network stacks (VNSs), where each VNIC of the plurality of VNICs is associated with the virtual switch and with a different one of the plurality of execution environments, where each VNIC of the first plurality of VNICs inherits at least one data link attribute from the virtual switch, and where each VNS of the plurality of VNSs is associated with a different one of the plurality of VNICs and with a different one of the plurality of execution environments.

Other aspects of the invention will be apparent from the following description and the appended claims.

DETAILED DESCRIPTION

Figure 1A:
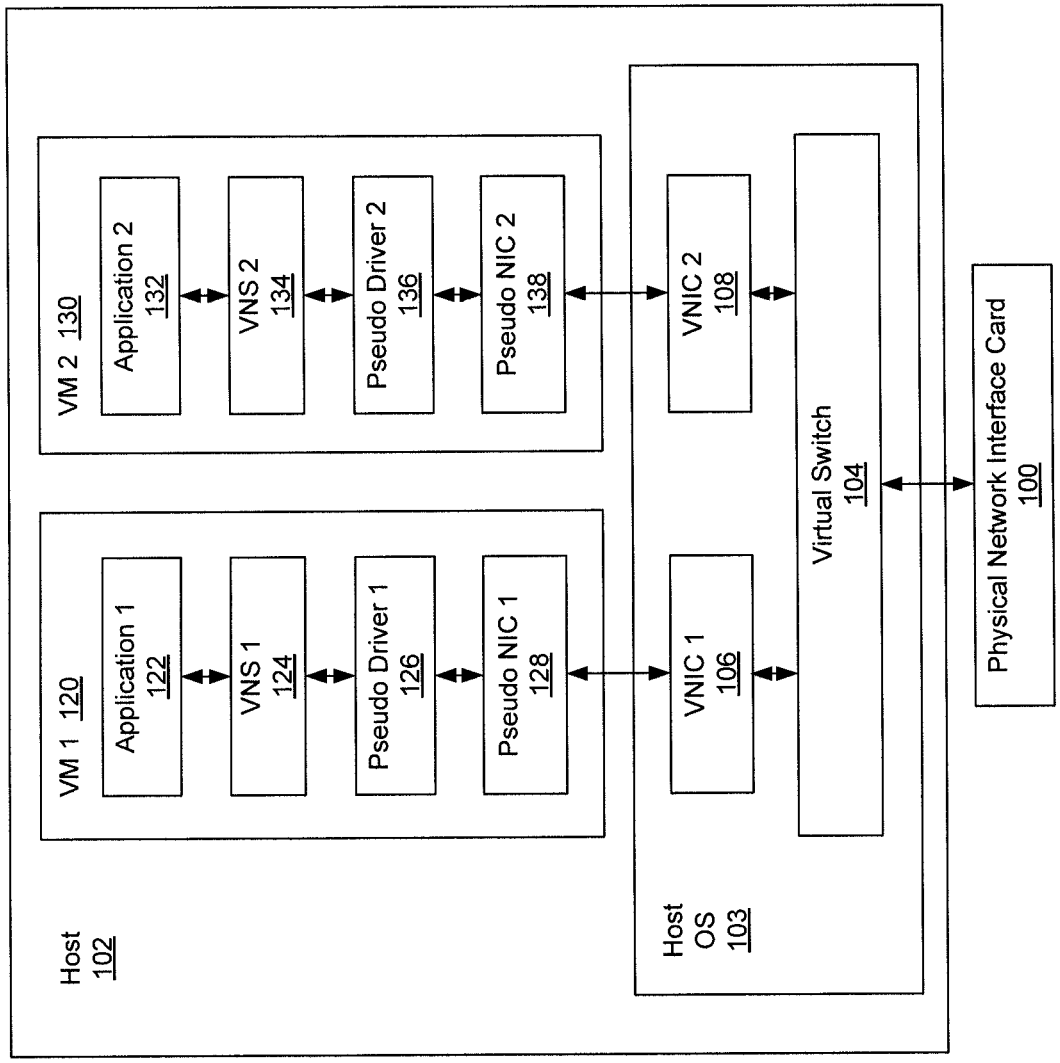
FIGS. 1A-1B show systems in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a virtual switch. More specifically, embodiments of the invention provide a mechanism to create a virtual network within a host, where the virtual network includes two or more execution environments operatively connected to the virtual switch. In one or more embodiments of the invention, the two or more execution environments may be either virtual machines or containers.

As used herein, the term "virtual machine" refers to an isolated software execution environment, which simulates an entire computer device (i.e., processes executing on the virtual machine execute as if they are on a physical computing device). Further, each virtual machine may include its own operating system instance, which may not necessarily be the same as the operating system of the host.

As used herein, the term "container" refers to an isolated software execution environment located within a single operating system instance. In other words, each container does not include its own operating system instance, but rather uses the same operating system instance as the host.

More specifically, all of the containers (global and non-global) share a common kernel and, accordingly, are executing the same operating system. While all of the aforementioned containers share a common kernel, the non-global containers (see FIG. 1B) are configured such that processes executing in a given non-global container are restricted to execute in the non-global container and have no access to resources not assigned to the non-global container. An example of a container is a Solaris™ Container. (Solaris is a trademark of Sun Microsystems, Inc. of California, USA).

FIG. 1A shows a system including virtual machines, in accordance with one or more embodiments of the invention. As shown in FIG. 1A, in one or more embodiments, the system includes a host (102) (i.e., a hardware computing device) and a physical NIC (100). Further, as shown, the host (102) may include a host operating system (OS) (103) and one or more virtual machines (VMs) (120, 130). In one or more embodiments, the host OS (103) may include functionality to execute the VMs (120, 130). For example, the host OS (103) may include/implement a hypervisor (e.g., in a VMware® Server virtualization environment) (not shown) or a first domain (e.g., DOM 0 in a Xen® virtualization environment) (not shown). VMware® is a registered trademark of VMware, Inc. Xen® is a trademark overseen by the Xen Project Advisory Board.

Each VM (120, 130) may include one or more applications (122, 132) executing within the VM (120, 130), a virtual network stack (VNS) (124, 134) (see FIG. 2), a pseudo driver (126, 136), and a pseudo NIC (128, 138). Each pseudo NIC (128, 138) may be connected to a corresponding virtual network interface card (VNIC) (106, 108). Further, each VNIC (106, 108) may be connected to a virtual switch (104). Further, the virtual switch (104) may be connected to a physical network interface card (NIC) (100). Each of the aforementioned components is discussed below.

In one or more embodiments, the physical NIC (100) is configured to receive packets from a network (not shown) (e.g., a LAN, a WAN, etc.) and send the received packets to the host (102). Further, the physical NIC (100) is also configured to receive packets from the host (102) and send the packets towards their intended destination on the network (not shown).

In one or more embodiments, the virtual switch (104) is a virtualized representation (i.e., software emulation) of a network switch (i.e., a physical networking device that connects network segments). Optionally, the virtual switch (104) may include one or more ports (not shown) (i.e., defined communications endpoints). In one or more embodiments, the virtual switch (104) may be assigned an identifier to identify a virtual switch within the host (102).

In one or more embodiments, the VNICs (106, 108) are virtualized representations of physical NICs (e.g., physical NIC (100) discussed above). Said another way, to components above the VNICs (106, 108) (e.g., VMs (120, 130)), the VNICs (106, 108) appear as physical NICs. In one or more embodiments of the invention, each VNIC (106, 108) is assigned a unique hardware address (e.g., a MAC address) and an Internet Protocol (IP) address. The use of the term "unique" is intended to convey that the each IP and MAC address is unique with respect to the host but may not be unique with respect to all other IP or MAC addresses present on systems operatively connected to the host via the network.

In one or more embodiments, as shown in FIG. 1A, each VNIC (106, 108) may be associated with a VM (120, 130). Further, each VNIC (106, 108) may be configured to send packets from the associated VM (120, 130) to the virtual switch (104), and to send packets from the virtual switch (104) to the associated VM (120, 130).

In one or more embodiments, each VNIC (106, 108) is connected to a pseudo NIC (128, 138) included in the associated VM (120, 130). Each pseudo NIC (128, 138) may include functionality similar to that of the VNICs (106, 108) described above. Further, each pseudo NIC (128, 138) may be configured by the operating system instance (not shown) of the VM (120, 130) within which the pseudo NIC (128, 138) is located.

In one or more embodiments, each pseudo NIC (128, 138) may be associated with a pseudo driver (126, 136). Each pseudo driver (126, 136) is a software interface between the VNS (124, 134) and the pseudo NIC (128, 138). In other words, the pseudo driver (126, 136) includes the same functionality as a driver to a physical device (e.g., a NIC driver (not shown) for the physical network interface card (100)). Further, as shown in FIG. 1, each VNS (124, 134) may be associated with one or more applications (122, 132) executing within the VM (120, 130). In one or more embodiments, the applications (122, 132) may include functionality to issue and receive packets.

Figure 1B:
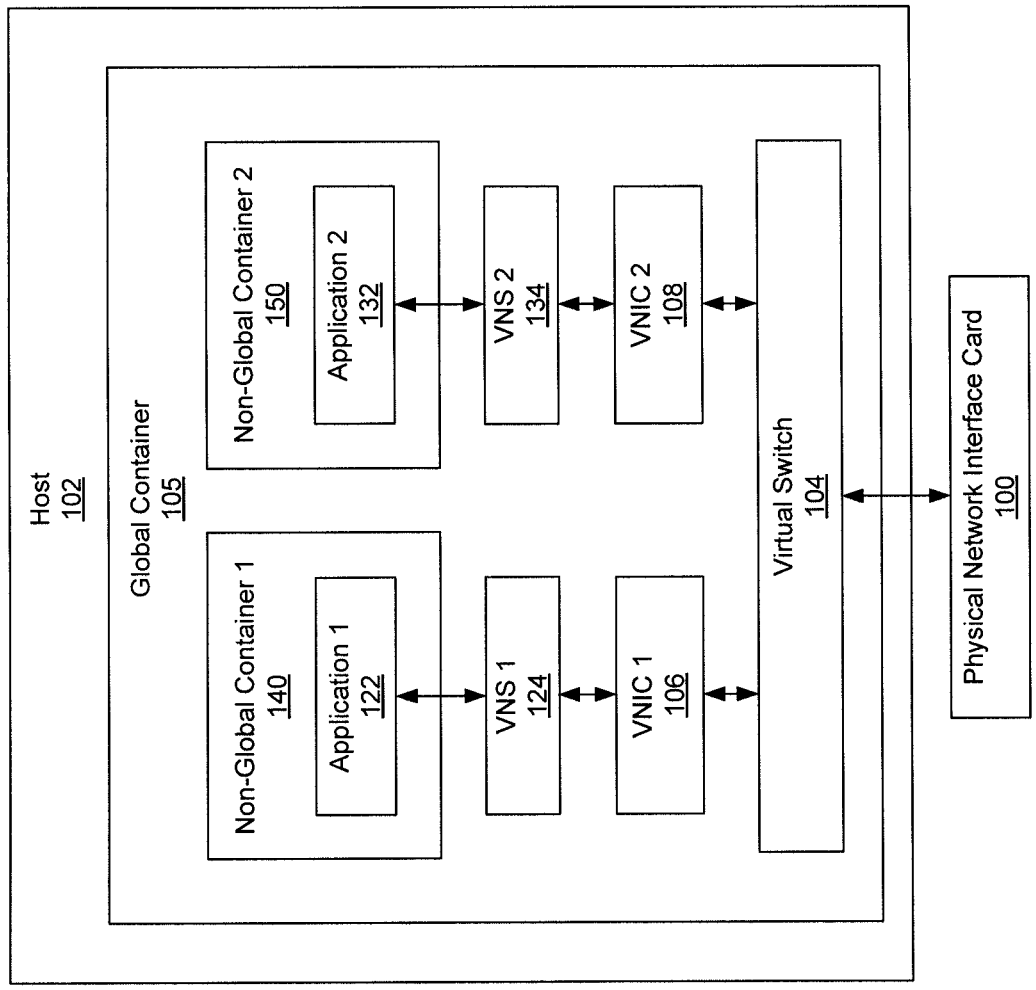

FIG. 1B shows a system including containers, in accordance with one or more embodiments of the invention. As shown in FIG. 1B, in one or more embodiments, the host (102) may include a global container (105) executing within a host OS (not shown). Further, the global container (105) may include one or more non-global containers (140, 150). For example, the global container (105) and non-global containers (140, 150) may be Solaris™ Containers executing within a Solaris™ OS. Solaris™ is a trademark of Sun Microsystems, Inc.

As shown in FIG. 1B, one or more applications (122, 132) may be executed within the non-global container (140, 150). In one or more embodiments, a VNS (124, 134) (see FIG. 2) may connect each non-global container (140, 150) to a corresponding virtual network interface card (VNIC) (106, 108). Further, each VNIC (106, 108) may be connected to a virtual switch (104). In one or more embodiments, the virtual switch (104) may be connected to a physical network interface card (NIC) (100). Note that, while FIGS. 1A-1B only show a single virtual switch (104), the host (102) may include multiple virtual switches.

Referring to FIGS. 1A-1B, in one or more embodiments, the host (102) may include a Vswitch table (not shown) configured to identify which VNICs (106, 108) are associated with the virtual switch (104) and, thus, are able to communicate with each other. More specifically, each virtual switch (104) may be associated with a Vswitch table, where the Vswitch table includes an entry for each VNIC (106, 108) associated with the virtual switch (104). Thus, by adding an entry to a Vswitch table associated with a virtual switch (104), the VNIC (106, 108) identified in the entry is now able to conceptually link to the virtual switch (104) and, accordingly, is able to communicate with the other VNICs (106, 108) associated with the virtual switch (104). In view of the above, in FIGS. 1A-1B, the arrows showing a link between the virtual switch (104) and the VNICs (106, 108) correspond to conceptual links, where the links are realized through the entries in the associated Vswitch table. In one or more embodiments, the virtual switch (104), the VNICs (106, 108), and the Vswitch table may be included in a Media Access Control (MAC) layer of the host (102).

In one or more embodiments, each of the entries in the Vswitch table may include a hardware address (HA) (e.g., a MAC address) associated with the VNIC (106, 108). In addition, each of the entries in the Vswitch table may include a pointer to a VNIC data structure (i.e., a data structure associated with the VNIC) (not shown). In one or more embodiments, each VNIC data structure may include a function for sending a packet to the VNIC (106, 108). In one or more embodiments, each entry in the Vswitch table satisfies the following conditions: (i) the entry is associated with the VNIC; (ii) the VNIC is associated with the virtual switch; and (iii) the VNIC and virtual switch reside on the same host. In one or more embodiments, there may be a single Vswitch table for all VNSs on a given virtual switch, or for all VNSs on the host. In one or more embodiments, as new VNICs are associated with the virtual switch (104), or as previously-associated VNICs are disassociated from the virtual switch (104), the Vswitch table is updated accordingly. In one or more embodiments, a single Vswitch table may exist for all virtual switches on the host. Further, in one or more embodiments, a Vswitch table may also include broadcast and multicast addresses to distribute packets to multiple VNICs and/or to the physical NIC. In one embodiment of the invention, the Vswitch table is located in the MAC layer (103).

Figure 2:
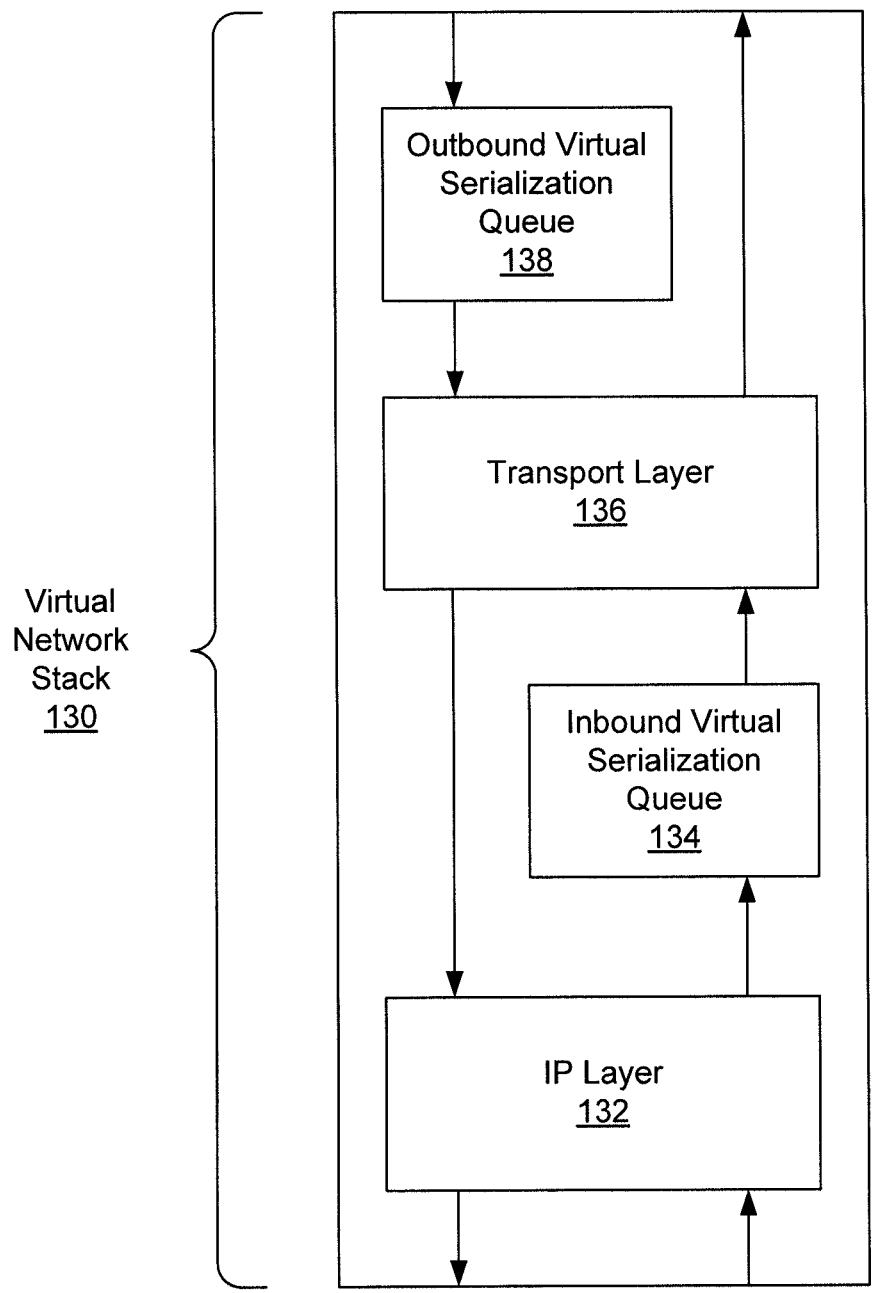
FIG. 2 shows a virtual network stack in accordance with one or more embodiments of the invention.

FIG. 2 shows a virtual network stack (VNS) (130) in accordance with one embodiment of the invention. Specifically, the VNS (130) shown in FIG. 2 may represent the VNSs (124, 134) shown in FIGS. 1A-1B. In one or more embodiments, the VNS (130) includes an Internet Protocol (IP) layer (132), an inbound virtual serialization queue (VSQ) (134), a transport layer (136), and an outbound serialization queue (138). Each of the aforementioned components is discussed below.

In one embodiment, the IP layer (132) is configured to receive packets from a VNIC associated with the VNS (130). For example, referring to FIG. 1B, VNS 1 (124) can receive packets from VNIC 1 (106). Further, the IP layer (132) is configured to receive packets from the transport layer (136). In one embodiment of the invention, the IP layer (132) is configured to perform IP level processing for both inbound and outbound packets. In one embodiment of the invention, the IP layer (132) is associated with a hardware address to IP address mapping.

Continuing with the discussion of FIG. 2, the inbound VSQ (134) is configured to receive packets from the IP layer (132). The inbound VSQ (134) corresponds to a queue data structure and is configured to queue packets received from the IP layer (132) prior to the packets being processed by the transport (136). In one embodiment of the invention, the inbound VSQ (134) may be used to control the number of packets being received by the execution environment (e.g., VMs (120, 130), non-global containers (140, 150), etc.) associated with VNS. The inbound VSQ (134) may control the bandwidth by limiting the number of packets in the VSQ (134) and preventing additional packets from entering the VNS (130) until the inbound VSQ (134) has less than a threshold number of packets. In one or more embodiments, the transport layer (136) is configured to process inbound and outbound packets in accordance with Transmission Control Protocol (TCP), User Datagram Protocol (UDP), or both UDP and TCP.

In one or more embodiments, the outbound VSQ (138) is a queue data structure configured to receive packets from the execution environment with which the VNS (130) is associated. Further, the outbound VSQ (138) is configured store packets prior to sending the received packets to the transport layer (136). In one embodiment of the invention, the outbound VSQ (138) is also configured to control the flow of packets from the execution environment associated with the VNS (130) to the VNS (130). In one embodiment of the invention, the outbound VSQ (138) (or a related process) is configured to block an application executing in an execution environment from sending packets to the outbound VSQ (138), if the application is attempting issue packets at a higher rate than the outbound bandwidth allocated to the execution environment. Further, the outbound VSQ (138) (or a related process) is configured to notify the application when it is no longer blocked from issuing packets to the VNS (130).

In one or more embodiments, the inbound VSQ (134) and outbound VSQ (138) are each configured to enforce the manner in which packets are processed. Specifically, the inbound VSQ (134) and outbound VSQ (138) may be configured to enforce the packet processing requirements imposed by the transport layer (136). For example, TCP requires serial processing of packets. Thus, the inbound VSQ (134) and outbound VSQ (138) may require all threads accessing the inbound VSQ (134) and outbound VSQ (138) to conform to a mutual exclusion policy. In one or more embodiments, the mutual exclusion policy requires that only one thread may access the VSQ at a time. Thus, if two threads are attempting to access a given VSQ, one thread must wait until the other thread has finished accessing the VSQ.

Alternatively, if the transport layer (136) only supports UDP, then the inbound VSQ (134) and outbound VSQ (138) may be configured to allow concurrent access. Said another way, two or more threads may concurrently access the VSQ. In one or more embodiments, if the transport layer (136) is configured to process both TCP and UDP packets, then the inbound VSQ (134) and outbound VSQ (138) are configured to conform to the more stringent standard (e.g., TCP if the transport layer supports both TCP and UDP).

Figure 3A:
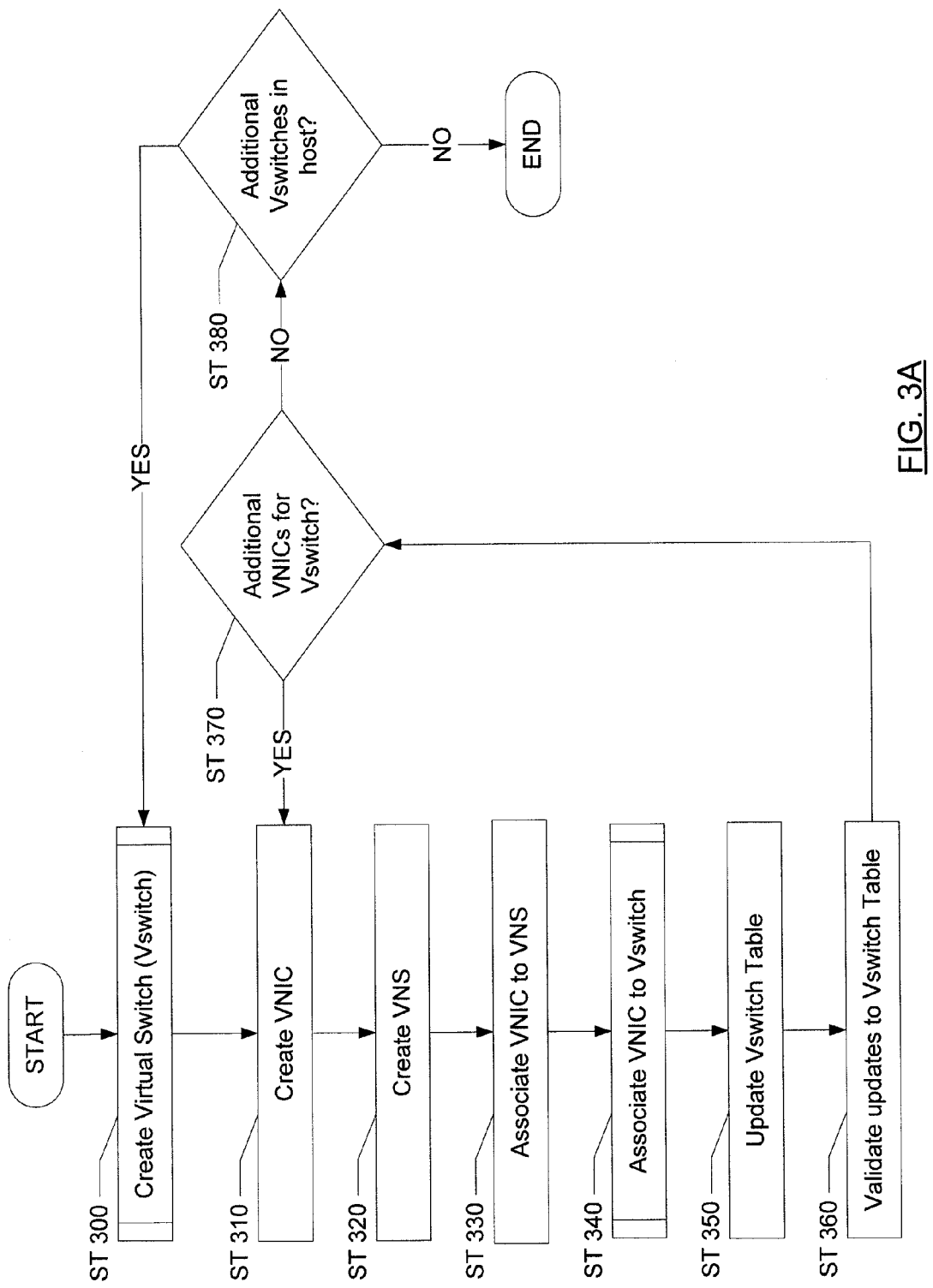
FIGS. 3A-3C and 4 show flowcharts in accordance with one or more embodiments of the invention.

FIG. 3A shows a flowchart in accordance with one embodiment of the invention. While the various steps in the flowchart are presented and described sequentially, one of ordinary skill will appreciate that some or all of the steps may be executed in different orders, may be combined, or omitted, and some or all of the steps may be executed in parallel. More specifically, FIG. 3A shows a method for setting up a virtual switch in a host, in accordance with one or more embodiments.

At ST 300, a virtual switch (e.g., virtual switch (104) shown in FIGS. 1A-1B) may be created. In one or more embodiments, a virtual switch may be created with one or more data link attributes. As used herein, the term "data link attributes" refers to predefined properties which are inherited by VNICs connected to the virtual switch. Specifically, in one or more embodiments, when a VNIC is associated with a virtual switch, the data link attributes of the virtual switch may be automatically assigned to the VNIC. ST 300 is described in greater detail below with reference to FIG. 3B.

In one or more embodiments, the creation of the virtual switch (i.e., designating a name for the virtual switch) instantiates the creation of a Vswitch table. At ST 310, a VNIC (e.g., VNIC (106) shown in FIGS. 1A-1B) is created. At ST 320, a VNS (e.g., VNS 1 (124) shown in FIGS. 1A-1B) is created. In one embodiment of the invention, creating a VNIC includes assigning a MAC address and, optionally, an IP address to the VNIC. At ST 330, the VNIC may be associated with the VNS. At ST 340, the VNIC may be associated with the virtual switch. ST 340 is described in greater detail below with reference to FIG. 3C.

At ST 350, the virtual switch (or a related process) updates the Vswitch table. Specifically, an entry for correspond to the VNIC (i.e., the VNIC associated with the virtual switch in ST 340) is added to the Vswitch table. The entry includes a MAC address of the VNIC as well as pointer to a VNIC data structure (i.e., a data structure associated with the VNIC), where the data structure includes a function to be invoked when sending a packet to the VNIC. In one or more embodiments, each of the Vswitch table entries added in ST 350 is validated to ensure that they are correct (ST 360).

The process then proceeds to ST 370, where a determination is made about whether any other VNICs need to be created and associated with the virtual switch. If it is determined that additional VNICs need to be created, the process returns to ST 310. Alternatively, if it is determined that additional VNICs do not need to be created (at least at this time), then the process proceeds to ST 380.

At ST 380, a determination is made about whether any other virtual switches need to be created (at this time) in the system. If it is determined that additional virtual switches do not need to be created, the process ends. Alternatively, if it is determined that additional virtual switches need to be created, the process returns to ST 300. In one or more embodiments, a virtual switch may be created at any time while the host is executing. Further, a VNIC may be associated with a virtual switch at any time or an association of a VNIC with the virtual switch may be removed at any time.

Figure 3B:
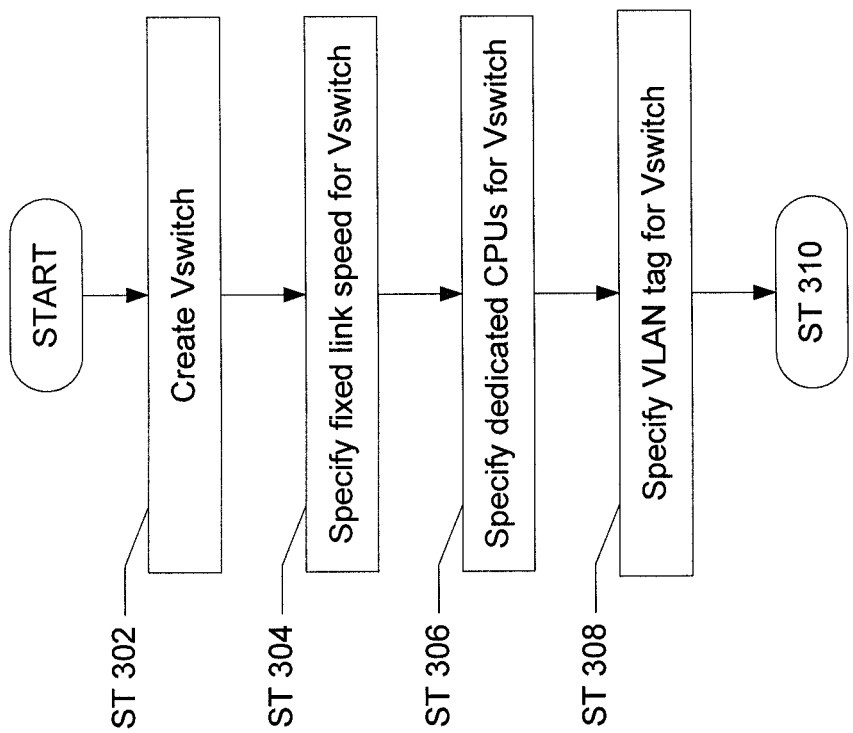

FIG. 3B shows a flow chart for creating a virtual switch with one or more data link attributes, in accordance with one embodiment of the invention. While the various steps in the flowchart are presented and described sequentially, one of ordinary skill will appreciate that some or all of the steps may be executed in different orders, may be combined, or omitted, and some or all of the steps may be executed in parallel. In particular, FIG. 3B illustrates an exemplary expansion of the steps involved in performing ST 300 (shown in FIG. 3A). At ST 302, the virtual switch may be created. At ST 304, a fixed link speed may be specified as a data link attribute of the virtual switch. For example, the fixed link speed may be specified as a maximum bandwidth limit allocated to the virtual switch. Those skilled in the art will appreciate that the link speed specified for the virtual switch may be less than the link speed of the underlying physical network interface card.

At ST 306, one or more CPUs (or a defined group of CPUs) may be specified as a data link attribute of the virtual switch. In one or more embodiments, the specified CPUs may be allocated to the virtual switch. The specified CPUs may then be available for use the by VNICs associated with the virtual switch. Those skilled in the art will appreciate that the specified CPUs allocated to the virtual switch may be less than the total number of available processors on the host. At ST 308, a Virtual Local Area Network (VLAN) tag may be specified as a data link attribute of the virtual switch. As used herein, the term "VLAN" refers to a group of hosts that has the same attributes as a physical LAN, but which allows for hosts (or more specifically, containers or VMs on hosts) to be grouped together even if they are not located on the same network switch. In one or more embodiments, the VLAN tag is an identifier that is added to data frames to enable use of a VLAN.

After ST 308 (e.g., the virtual switch (104) has been created and data link attributes have been specified), the process continues at ST 310 (shown in FIG. 3A). One of skill in the art will appreciate that the examples described above are for illustrative purposes only, and are not intended to limit of the invention. In particular, a virtual switch may have additional and/or different data link attributes than those described with reference to FIG. 3B. For example, the data link attributes may include a priority value, which may be used to determine a scheduler priority assigned to the threads of a VNIC and/or to Packet Flow Context (PFC) packets of a VNIC.

In one or more embodiments, data link attributes of a virtual switch may be automatically inherited by any VNIC connected to the virtual switch. For example, referring to FIGS. 1A-B, assume that virtual switch (104) is assigned a maximum bandwidth limit of 100 Mb/s (Megabits per second). Assume further that VNIC (106) and VNIC (108) are subsequently associated with the virtual switch (104). Thus, in one or more embodiments, VNIC (106) and VNIC (108) are each automatically assigned the maximum bandwidth limit of 100 Mb/s. Thereafter, in the event that the combined actual bandwidth requirements of VNIC (106) and VNIC (108) exceed 100 Mb/s (i.e., the bandwidth limit of the virtual switch (104)), the virtual switch (104) may apply a policy to allocate the available bandwidth to the VNICs (106, 108). For example, when the VNICs (106, 108) are in conflict over the virtual switch (104) may allocate the bandwidth equally among the VNICs (e.g., 50 Mb/s to VNIC (106) and 50 Mb/s to VNIC (108)), or may allocate the bandwidth in proportion to a priority assigned to the VNIC (e.g., 60% of available bandwidth to VNIC (106) and 40% of available bandwidth to VNIC (108)).

Alternatively, in or more embodiments, each VNIC may be assigned a fixed portion of the data link attributes of the virtual switch according to a policy. For example, assume that, at the time that the VNIC (106) is associated with the virtual switch (104), the VNIC (106) is assigned a fixed portion (e.g., 10 Mb/s, 20 Mb/s, etc.) or a percentage (e.g., 10%, 20%, etc.) of the 100 Mb/s bandwidth limit of the virtual switch (104). Optionally, when the VNIC (108) is subsequently associated with the virtual switch (104), the fixed portion or percentage assigned to each VNIC (106, 108) may be kept constant, or may be adjusted according to policy. In the case of a data link attribute including a group of CPUs assigned to a virtual switch (104) (e.g., see ST 306 shown in FIG. 3B), the entire group of CPUs may be allocated to each VNIC, may be split evenly among the VNICs, or may be allocated according to other policies (e.g., time sharing).

Figure 3C:
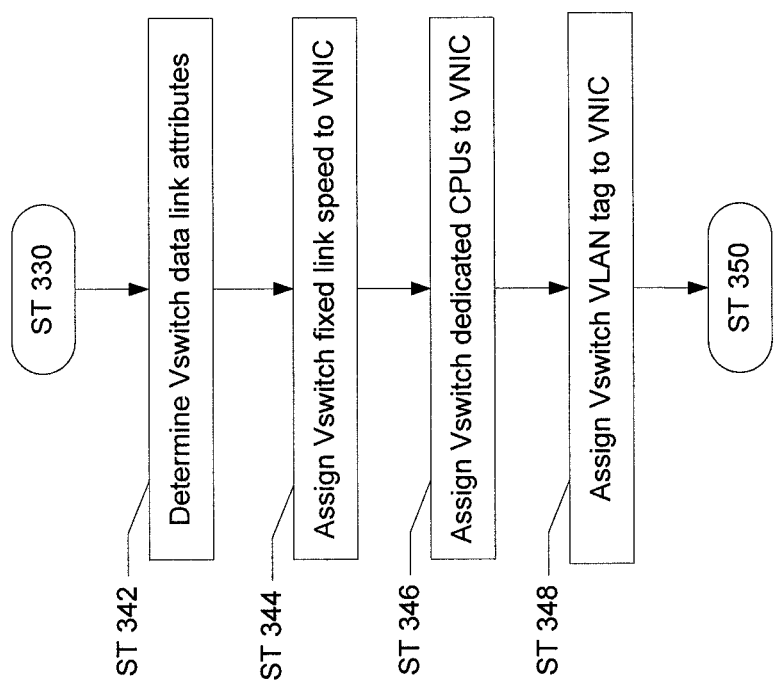

FIG. 3C shows a flow chart for associating a VNIC to a virtual switch, in accordance with one embodiment of the invention. While the various steps in the flowchart are presented and described sequentially, one of ordinary skill will appreciate that some or all of the steps may be executed in different orders, may be combined, or omitted, and some or all of the steps may be executed in parallel.

In particular, FIG. 3C illustrates an exemplary expansion of the steps involved in performing ST 340 (shown in FIG. 3A), after associating a VNIC to a VNS at ST 330. At ST 342, any data link attributes of the virtual switch may be determined. In one or more embodiments, such data link attributes may have been specified according to the method shown in FIG. 3B (discussed above).

At ST 344, a fixed link speed (i.e., a data link attribute of the virtual switch) may be assigned to the VNIC. For example, when a VNIC (106, 108) is connected to a virtual switch (104), the VNIC (106, 108) may inherit a bandwidth limit specified in the data link attributes of the virtual switch (104).

At ST 346, one or more CPUs may be assigned to the VNIC. For example, when the VNIC (106, 108) is connected to the virtual switch (104), one or more CPUs specified in a data link attribute may be allocated to the VNIC (106, 108), such that all processing required by the VNIC (106, 108) is performed by the specified CPUs.

At ST 348, a VLAN tag may be assigned to the VNIC. For example, when the VNIC (106, 108) is connected to the virtual switch (104), the VNIC (106, 108) may be provided with an identifier for a VLAN, such that the VNIC (106, 108) may perform tag insertion (or deletion) for data frames being sent to (or received from) the VLAN. In one or more embodiments, each VNIC (106, 108) may be configured to use the VLAN tag to maintain separation from other VLANs.

After ST 348 (e.g., the VNIC (106, 108) has been associated with virtual switch (104) and has inherited all data link attributes), the process continues at ST 350 (shown in FIG. 3A). Note that the data link attributes shown in FIGS. 3B-3C are provided for illustrative purposes, and are not intended to limit the invention. One of skill in the art will appreciate that a virtual switch and/or VNIC may include data link attributes in addition to those shown in FIGS. 3B-3C.

Figure 4:
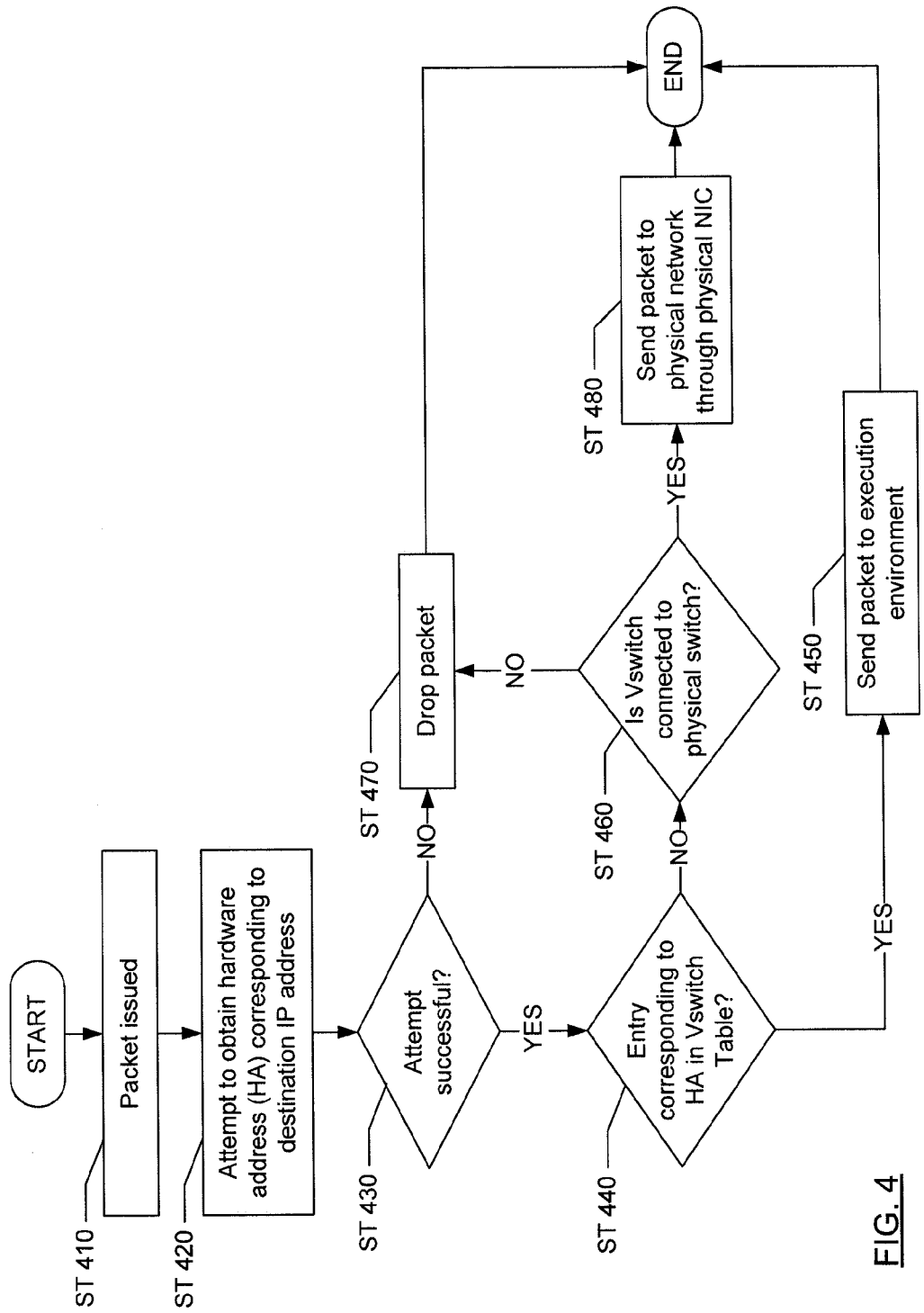

FIG. 4 shows a flowchart in accordance with one embodiment of the invention. More specifically, FIG. 4 shows a method for issuing a packet by an execution environment, in accordance with one embodiment of the invention. Initially, a packet is issued by an execution environment, where the execution environment is associated with a VNIC and the VNIC is associated with a virtual switch (ST 410). An attempt is made by a VNS associated with the execution environment to obtain the hardware address (HA) corresponding to a destination IP address of the packet (ST 420). In one or more embodiments, ST 420 may include (i) querying an Address Resolution Protocol (ARP) table to determine the HA corresponding to the destination IP address and (ii) issuing an ARP request if the query in (i) is not successful. In one or more embodiments, issuing an ARP request includes sending a broadcast packet to the associated VNIC. The VNIC, upon receiving the broadcast packet, sends the broadcast packet to all VNICs associated with the virtual switch. If the destination IP address is associated with a VNIC associated with the virtual switch, then an ARP response including the HA of the aforementioned VNIC is generated and returned to the requesting VNIC. Alternatively, if the destination IP address is not associated with a VNIC associated with the virtual switch, then the ARP request fails and the HA is not obtained.

Returning to FIG. 4, if the HA is obtained then the attempt to obtain the HA was successful (ST 430) and the process proceeds to ST 440. At ST 440, the Vswitch table is queried to determine the presence of an entry that includes the HA. If such an entry is present, the packet is sent to the VNIC associated with the HA, once the packet reaches the VNIC the packet is sent to the execution environment associated with the destination IP address (ST 450). As discussed above, the packet may be sent to the VNIC associated with the HA by executing a function located in a VNIC data structure referenced by a pointer in the aforementioned entry. The function, when executed, sends the packet to the VNIC associated with the HA. Further, in one or more embodiments, the sending and/or receiving of the packet by a VNIC is limited by the bandwidth limit assigned to the VNIC, which in turn is limited by the bandwidth limit assigned to the virtual switch (see example described above).

Alternatively, if it determined at ST 440 that an entry including the HA is not found in the Vswitch table, then the process proceeds to ST 460, where a determination is made about whether the virtual switch is connected to a physical switch located in the physical network. If so, then at ST 480, the packet is sent on the physical network through a physical NIC (e.g., physical NIC (100) shown in FIGS. 1A-1B). Alternatively, if it is determined at ST 460 that the virtual switch is not connected to a physical switch, then the process proceeds to ST 470, where the packet is dropped (i.e., not sent to the execution environment associated with the destination IP address).

If the HA is not obtained at ST 420, then the attempt to obtain the HA is not successful (ST 430) and the process proceeds to ST 470, where the packet is dropped (i.e., not sent to the execution environment associated with the destination IP address). In one or more embodiments, an attempt to obtain the HA may be successful (i.e., ST 430), but if subsequent to obtaining the HA and prior to querying the Vswitch table, the VNIC's association with the HA is removed, ST 440 is unsuccessful.

Figure 5:
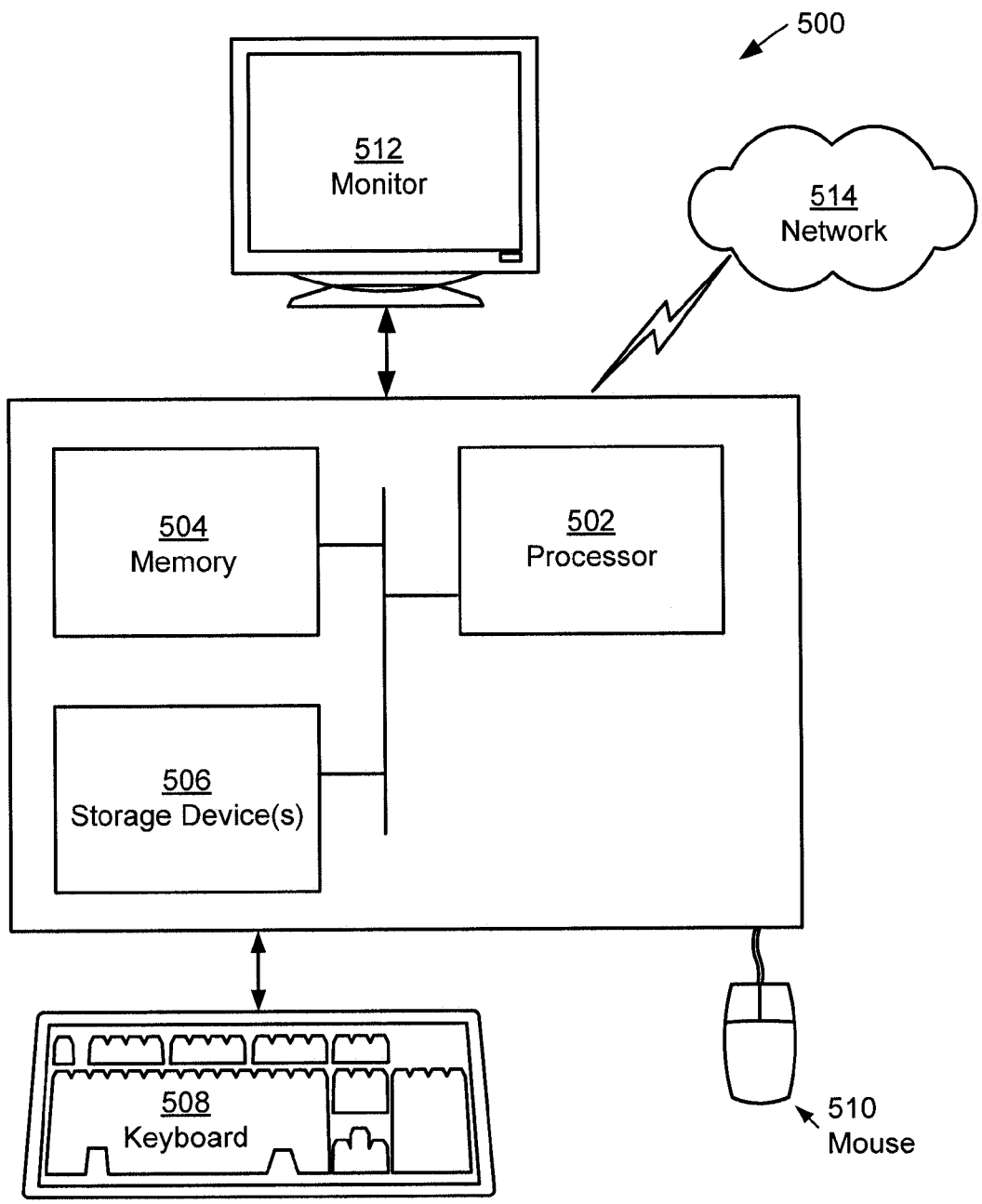
FIG. 5 shows a computer system in accordance with one or more embodiments of the invention.

An embodiment of the invention may be implemented on virtually any type of computer regardless of the platform being used. For example, as shown in FIG. 5, a networked computer system (500) includes a processor (502), memory (504), one or more storage devices (506), and numerous other elements and functionalities typical of today's computers (not shown). The networked computer (500) may also include input means, such as a keyboard (508) and a mouse (510), and output means, such as a monitor (512). The networked computer system (500) is connected to a local area network (LAN) or a wide area network (514). Those skilled in the art will appreciate that these input and output means may take other forms. Further, those skilled in the art will appreciate that one or more elements of the aforementioned computer (500) may be remotely located and connected to the other elements over a network. Further, software instructions to perform embodiments of the invention may be stored on a computer readable medium such as a compact disc (CD), a diskette, a tape, or any other computer readable storage device.

Embodiments of the invention provide methods and systems to enable VNICs to inherit data link attributes from virtual switches. Accordingly, link speed and dedicated processing resources may be specified for a virtual switch, and subsequently automatically inherited by any connected VNICs. Further, such VNICs may enable separation between VLANs to be maintained.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable storage medium having computer readable program code embodied therein, the computer readable program code adapted to, when executed by a processor, implement a method for providing network connectivity to a host, the method comprising:
   creating a virtual switch on the host, wherein the virtual switch is connected to a physical network interface card (NIC) associated with the host;
   specifying at least one data link attribute of the virtual switch, wherein the at least one data link attribute comprises a link speed and at least one CPU associated with the virtual switch;
   creating a Vswitch table configured to identify virtual network interface cards (VNICs) associated with the virtual switch;
   creating a plurality of VNICs on the host, wherein each of the plurality of VNICs is associated with a different one of a plurality of execution environments;
   associating each of the plurality of VNICs with the virtual switch by adding each of the plurality of VNICs to the Vswitch table; and
   when associated with the virtual switch, automatically inheriting, by each of the plurality of VNICs, the at least one data link attribute of the virtual switch,
   wherein the plurality of execution environments is located on the host,
   wherein all processing required by the plurality of VNICs is performed by the at least one CPU, and
   wherein the plurality of VNICs is located on the host.

2. The non-transitory computer readable storage medium of claim 1, further comprising:
   creating a plurality of virtual network stacks (VNSs) on the host;
   associating each of the plurality of VNSs with a different one of the plurality of VNICs; and
   associating each of the plurality of VNSs with a different one of the plurality of execution environments.

3. The non-transitory computer readable storage medium of claim 1, wherein the at least one data link attribute of the virtual switch further comprises a virtual local area network (VLAN) tag.

4. The non-transitory computer readable storage medium of claim 1, wherein the at least one data link attribute of the virtual switch further comprises a priority value.

5. The non-transitory computer readable storage medium of claim 1, wherein the plurality of execution environments comprises a plurality of virtual machines.

6. The non-transitory computer readable storage medium of claim 5, wherein each of the plurality of virtual machines comprises a pseudo driver and a pseudo NIC.

7. The non-transitory computer readable storage medium of claim 1, wherein the plurality of execution environments comprises a plurality of containers.

8. The non-transitory computer readable storage medium of claim 1, wherein the plurality of VNICs is located on a Media Access Control (MAC) layer of the host.

9. The non-transitory computer readable storage medium of claim 1, further comprising:
receiving a packet by a first VNIC of the plurality of VNICs, wherein the packet is associated with a hardware address (HA);
determining, using a Vswitch table associated with the virtual switch, whether one of a plurality of entries in the Vswitch table is associated with the HA; and
upon determining that one of the plurality of entries in the Vswitch table is associated with the HA, sending the packet to a second VNIC, wherein the second VNIC is associated with the HA.

10. The non-transitory computer readable storage medium of claim 9, wherein the Vswitch table is located in a Media Access Control (MAC) layer of the host.

11. A method of providing network connectivity to a host, comprising:
creating a virtual switch on the host, wherein the virtual switch is connected to a physical network interface card (NIC) associated with the host;
specifying at least one data link attribute of the virtual switch, wherein the at least one data link attribute comprises a link speed and at least one CPU associated with the virtual switch;
creating a Vswitch table configured to identify virtual network interface cards (VNICs) associated with the virtual switch;
creating a plurality of VNICs on the host, wherein each of the plurality of VNICs is associated with a different one of a plurality of execution environments;
associating each of the plurality of VNICs with the virtual switch by adding each of the plurality of VNICs to the Vswitch table; and
when associated with the virtual switch, automatically inheriting, by each of the plurality of VNICs, the at least one data link attribute of the virtual switch,
wherein the plurality of execution environments is located on the host,
wherein all processing required by the plurality of VNICs is performed by the at least one CPU, and
wherein the plurality of VNICs is located on the host.

12. The method of claim 11, further comprising:
creating a plurality of virtual network stacks (VNSs) on the host;
associating each of the plurality of VNSs with a different one of the plurality of VNICs; and
associating each of the plurality of VNSs with a different one of the plurality of execution environments.

13. The method of claim 11, wherein the at least one data link attribute of the virtual switch further comprises a virtual local area network (VLAN) tag.

14. A system, comprising:
a physical network interface card (NIC);
a host, comprising:
a processor;
a virtual switch associated with the processor and operatively connected to the physical NIC;
a plurality of execution environments;
a plurality of virtual network interface cards (VNICs);
a Vswitch table configured to identify VNICs associated with the virtual switch; and
a plurality of virtual network stacks (VNSs),
wherein each VNIC of the plurality of VNICs is associated with the virtual switch by adding each of the plurality of VNICs to the Vswitch table,
wherein each VNIC of the plurality of VNICs is associated with a different one of the plurality of execution environments,
wherein, when associated with the VNIC switch, each VNIC of the first plurality of VNICs automatically inherits at least one data link attribute from the virtual switch,
wherein the at least one data link attribute of the virtual switch comprises a link speed and the processor,
wherein each VNS of the plurality of VNSs is associated with a different one of the plurality of VNICs and with a different one of the plurality of execution environments, and
wherein all processing required by the plurality of VNICs is performed by the processor.

15. The system of claim 14, wherein the at least one data link attribute of the virtual switch comprises a virtual local area network (VLAN) tag.

16. The system of claim 14, wherein the plurality of execution environments comprises at least one selected from a group comprising a plurality of virtual machines and a plurality of containers.

* * * * *